United States Patent
Diebold

[11] 3,802,114
[45] Apr. 9, 1974

[54] FISH LURE

[76] Inventor: Robert J. Diebold, 7113 36th Ave. N., St. Petersburg, Fla. 33710

[22] Filed: July 17, 1972

[21] Appl. No.: 272,203

[52] U.S. Cl. ................................... 43/37
[51] Int. Cl. ................................ A01k 91/00
[58] Field of Search .................... 43/35, 37

[56] References Cited
UNITED STATES PATENTS
| | | | |
|---|---|---|---|
| 3,410,019 | 11/1968 | Landi | 43/37 X |
| 2,544,782 | 3/1951 | Fawcett | 43/35 X |
| 2,955,377 | 10/1960 | Appel | 43/35 |

*Primary Examiner*—Russell R. Kinsey
*Assistant Examiner*—Robert F. Cutting
*Attorney, Agent, or Firm*—Edward C. Threedy

[57] ABSTRACT

A weedless fish lure in the form of an elongated body member having hooks pivotally carried by its tail portion which are radially pivotally mounted for outward movement relative to the body from a concealed position in slots formed in the body to impail fish when the latter has taken the lure, the pivotal movement of the hooks being as a result of a pulling force applied to the line against a drag imposed upon such line by the fish, the concealment of the hooks during trolling eliminating snagging or fouling of the hooks on weeds or the like.

3 Claims, 5 Drawing Figures

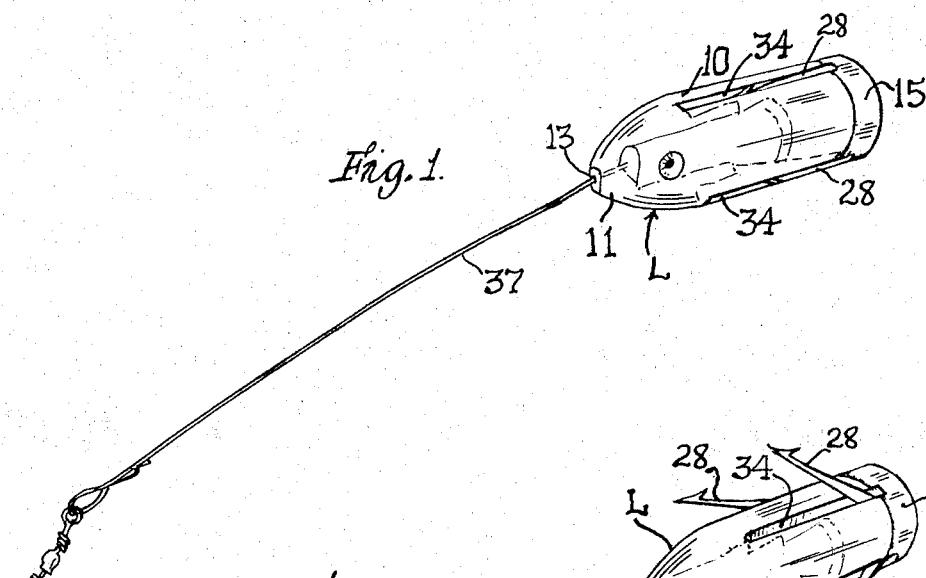
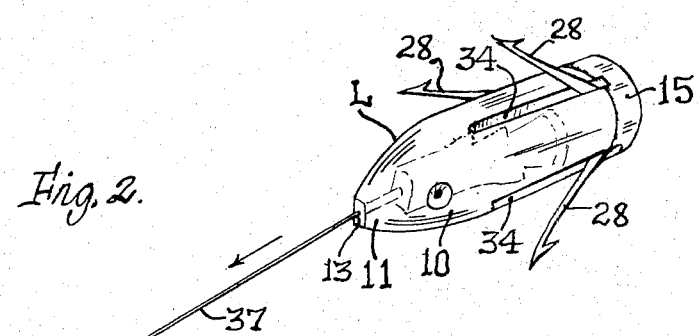
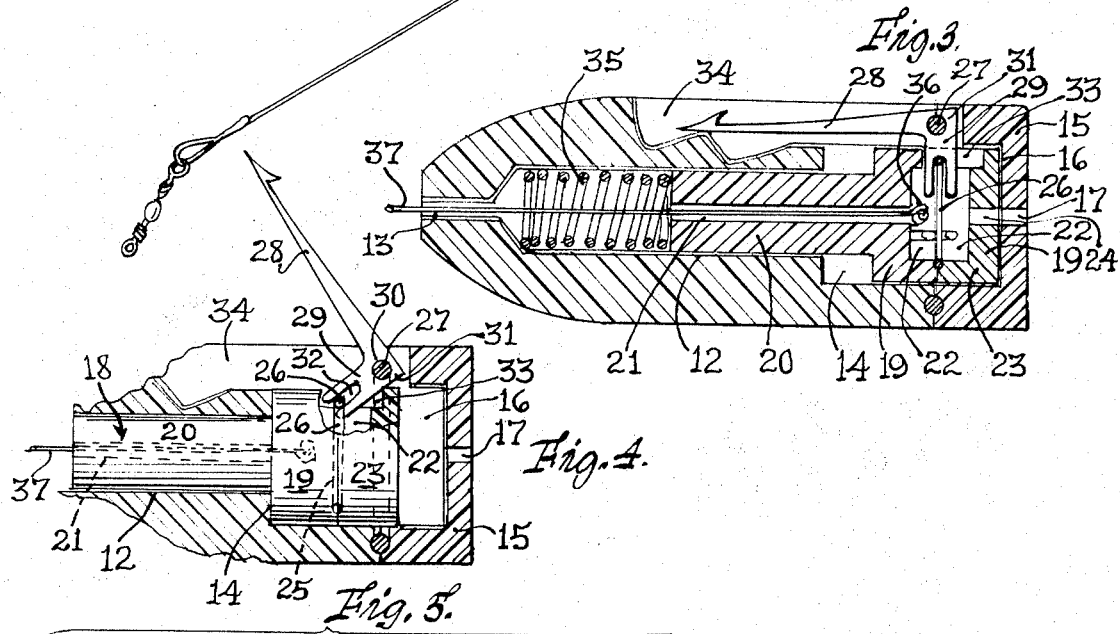
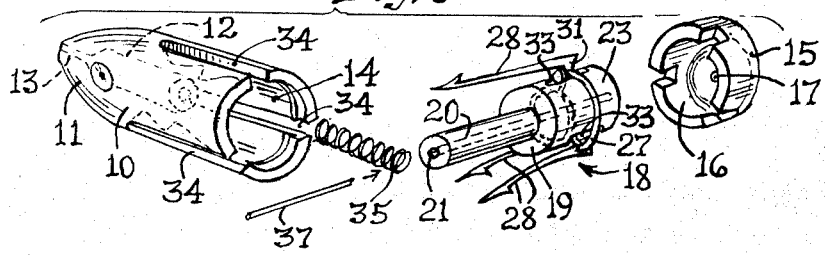

FISH LURE

SUMMARY OF THE INVENTION

The improved weedless fish lure employs hooks which are completely recessed into the body of the lure to avoid fouling or snagging on weeds or the like. This makes it possible for the lure to travel smoothly through the water without impediment of any type. At the moment of the fish's striking, the action of the fish will set up a resistance to the lure that instantly brings the hooks out of their recesses and impails the fish.

GENERAL DESCRIPTION

A better understanding of the invention will be had by reference to the accompanying drawings illustrating the preferred form of construction, in which:

FIG. 1 is a perspective view of the lure embodying the invention, with the hooks in concealed position;

FIG. 2 is a perspective view similar to FIG. 1, but showing the hooks in outward pivoted position;

FIG. 3 is a longitudinal sectional detail view of the lure shown in FIG. 1;

FIG. 4 is a fragmentary sectional detail view similar to FIG. 2, showing the hook in outward pivoted position;

FIG. 5 is an exploded perspective view of the lure.

My improved lure is indicated at L. Such lure is in the form of an elongated body 10 preferably having a tapered lead portion 11 which is decorated in any suitable manner to simulate the head of a fish. The body 10 is provided with an elongated bore 12. Entering this bore at the lead portion of the body is an opening 13. The bore 12 at the tail end portion of the body terminates into an enlarged counterbore 14. The body 10 at its tail end portion is closed by a cover 15 having a circular recess 16 of a size equal to the counterbore 14 and a center air vent 17 communicating with the counterbore 14.

A hook carrier 18 including a circular lead 19 and an elongated hollow shaft 20 projects into the bore 12 and counterbore 14. The shaft 20 has an elongated opening 21 formed therein which at the tail end portion of the head terminates into an open enlarged recess 22. This recess 22 is closed by a cap 23 which also is provided with an opening 24 in alignment with the opening 17 in the cover 15. The mating end surfaces of both the recess 22 and cap 23 are formed to provide therebetween a groove 25 (see FIG. 5). Captured in the groove 25 is a ring 26.

Within the body 10 between the end portion thereof and the cover 15 is a mounting ring 27 on which there is mounted in the present instance three substantially L-shaped barbed hooks 28. As these hooks are of like construction, the description of one will be applicable to the remaining hooks. Each hook 28 provides an angled end portion 29 having an opening 30 formed in the heel 31 thereof. The mounting ring 27 is adapted to pass through the opening 30 and thus pivotally connect the hook 28 to the body 10.

The angled end portion 29 of the hook 28 provides an open slot 32 which extends through a slot 33 formed in the peripheral wall of the head 19 and cap 23 of the hook carrier 18 (FIGS. 3 and 5) and receives the ring 26 carried by the hook carrier 18. In the side wall of the body 10 are formed open elongated slots 34 in which the long portions of the hooks 28 are positioned and concealed when inactive.

The hook carrier 18 is normally in the position shown in FIG. 3, with the hooks 28 retracted into the slots 34 by an expansion spring 35 arranged within the bore 12 between the end of the shaft 20 and the forward end of the bore 12. In its normal position as shown in FIG. 3, the hook carrier 18 will be disposed at the rear of the counterbore 14 and the hooks 28 will each be confined within their respective elongated slots 34 formed in the body 10 of the lure.

Secured to the carrier 18 as at 36 and extending through an elongated opening 21 formed in the shaft 16 and through the opening 13 of the body 10, is a line 37 by which the lure is propelled through the water.

OPERATION

When the lure is propelled through the water, the hooks 28 are yieldably retained in their respective slots 34 by the action of the spring 35 against the shaft 20 of the hook carrier 18. As soon as the fish bites on the lure L, a drag will be imposed upon the line 37, which as a result causes the hook carrier 18 to move in a forward direction within the body 10 against the action of the spring 35. This forward movement of the carrier 18 will, through the ring 26 moved with the carrier 18, impart pivotal movement to the hooks 28, pivoting them about the mounting ring 27 as shown in FIGS. 2 and 4, and impail the hooks in the mouth of the fish.

Upon removal of the lure L from the mouth of the fish, the spring 37 acting on the carrier 18 will cause the hooks 28 to pivot into their respective slots 34 in a concealed position, so that the lure L presents a smooth outer surface.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A weedless fish lure having an elongated body formed with a longitudinally extending bore therethrough terminating into an enlarged counterbore adjacent the trailing end of the lure, comprising a. a plurality of elongated hooks carried by and normally concealed within elongated open slots formed in the long side of said body, with said slots having open communication with the counterbore formed in said body, b. a mounting ring carried within the body encircling said enlarged counterbore and having portions extending and exposed through the elongated open slots to which said hooks are pivotally connected, c. a hook-pivoting member having an elongated shaft and an enlarged head portion movable through said bore and counterbore respectively formed in the body of the fish lure, with said head portion connected to said hooks so as to pivot the same through said slots as said head portion is moved through said counterbore of said body, d. means provided by each of said plurality of hooks and said enlarged head portion of said hook-pivoting member, forming a loose connection therebetween to permit said hooks to pivot about said mounting ring and through said slots as said enlarged head portion is moved through said counterbore formed in said body, e. a fish line connected to said hook-pivoting member for moving the same through said bore and counterbore in one direction to pivot said hooks out of the open slots when a fish drag is imposed upon the fish lure against the pull of the body by said fish line, and f. a coil spring within said bore of said body normally resisting movement of said hook-pivoting member in one direction through the body.

2. A weedless fish lure as defined by claim 1, wherein said plurality of elongated hooks are generally L-shaped so as to provide a leg and base portion, with said mounting ring pivotally connected thereto at the junction between the leg and base portion and with the base portion freely connected to said hook-pivoting member so as to pivot said hook relative to said mounting ring as the base portion thereof is moved with said hook-pivoting member in one direction.

3. A weedless fish lure as defined by claim 2 including a ring carried within said enlarged head portion of said hook-pivoting member which freely receives said base portion of said L-shaped hooks, which base portion is slotted so as to be loosely connected to said ring so as to pivot said hooks about said mounting ring to displace said leg portion of said hooks out of said open slots when said hook-pivoting member is moved in one direction through the body of said lure.

* * * * *